Sept. 15, 1925.
K. BARTHELMES
1,553,974
SPOUT FOR POTS AND SIMILAR VESSELS
Filed Feb. 12, 1923
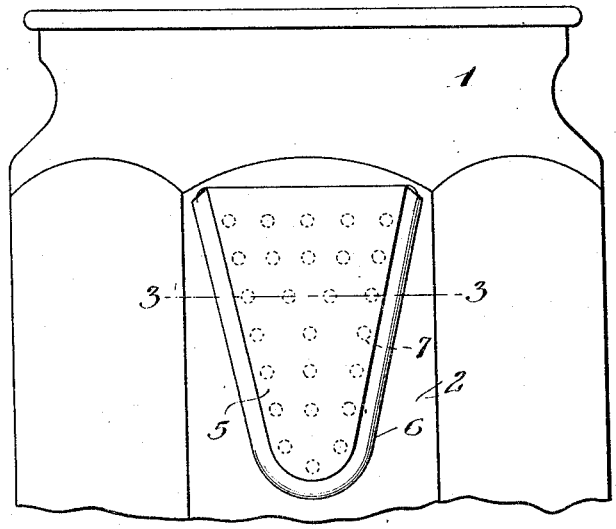
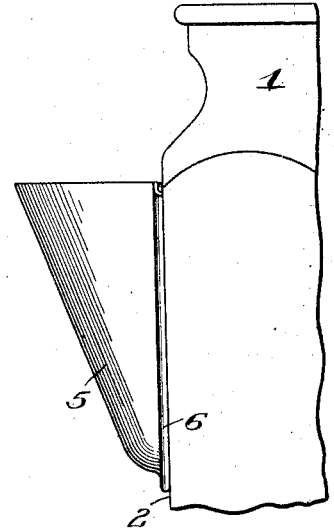
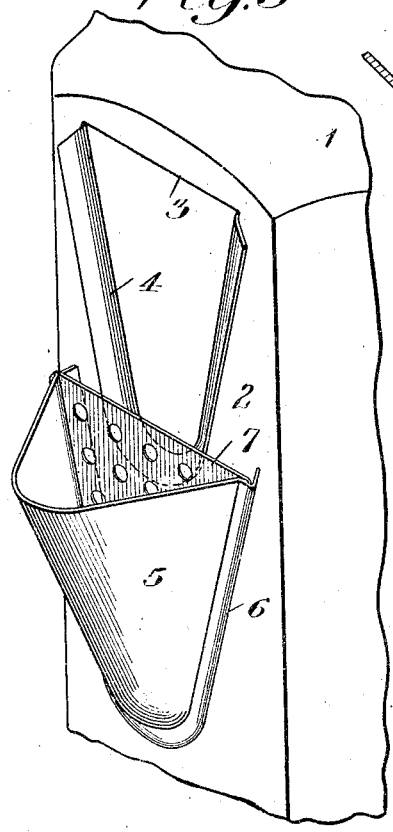
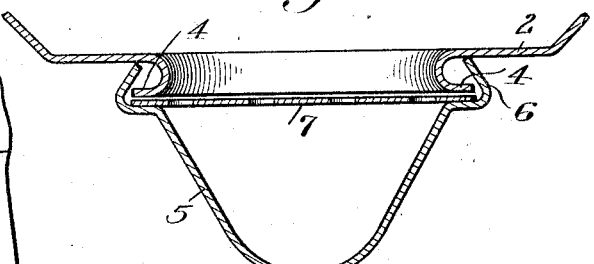
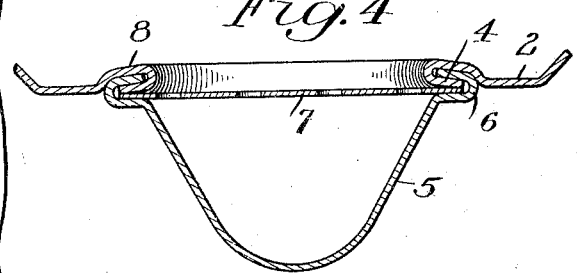
INVENTOR
Kurt Barthelmes
BY
his ATTORNEY Patented Sept. 15, 1925.

1,553,974

UNITED STATES PATENT OFFICE.

KURT BARTHELMES, OF ROCHESTER, NEW YORK, ASSIGNOR TO K. BARTHELMES MANUFACTURING COMPANY, INC., OF ROCHESTER, NEW YORK, A CORPORATION OF NEW YORK.

SPOUT FOR POTS AND SIMILAR VESSELS.

Application filed February 12, 1923. Serial No. 618,727.

*To all whom it may concern:*

Be it known that I, KURT BARTHELMES, a citizen of the United States, residing at Rochester, in the county of Monroe and State of New York, have invented certain new and useful Improvements in Spouts for Pots and Similar Vessels; and I do hereby declare the following to be a full, clear, and exact description of the same, reference being had to the accompanying drawing, forming a part of this specification, and to the reference numerals marked thereon.

My present invention relates to pots and kettles and generally to vessels provided with pouring spouts particularly when made of sheet metal and it has for its object to provide a simple and effective means of attaching the spout to the wall of the vessel so securely by means of interlocking seamed flanges that the use of solder is unnecessary. A further object of the invention is to confine a strainer plate in the spout by the same securing means and in a manner that renders both the exterior and interior of the vessel in the region of the seam neat and attractive. To these and other ends the invention resides in certain improvements and combinations of parts, all as will be hereinafter described, the novel features being pointed out in the claims at the end of the specification.

In the drawings:

Figure 1 is a front view of a fragment of a pot or a vessel provided with a spout constructed in accordance with and illustrating one embodiment of my invention.

Figure 2 is a fragmentary side view of the vessel and spout.

Figure 3 is an enlarged detail section on the line 3—3 of Figure 1 showing the parts assembled but before they are secured together.

Figure 4 is a similar view showing them secured together and

Figure 5 is a fragmentary perspective view illustrative of the manner in which the spout and strainer are assembled with the vessel.

Similar reference numerals throughout the several views indicate the same parts.

In the present instance I have illustrated my improvements applied to a coffee pot of a nature commonly manufactured from sheet aluminum which is difficult to solder and to which my improvements are therefore particularly applicable. Referring more particularly to the drawings 1 indicates the body of the pot having its sides octagonal in shape to present a plurality of flat walls 2. At the point where the pouring spout is to be located I punch in one of these walls 2 a downwardly tapering opening 3 preferably having a rounded lower end. At the margins of the opening with the exception of the top edge I form a continuous outwardly and laterally turned flange 4 which, in the preliminary formation has the shape shown in Figures 3 and 5.

The spout 5 is of the usual general shape, its base, or that portion which lies against the vessel being tapered downwardly to conform to the opening 3. The edges of the base are formed continuously into an inwardly turned folded or doubled flange 6 which, in the preliminary formation is somewhat flared or spread as shown in Figure 3. In the assembling, the spout is brought into position by an upward movement relatively to the wall 2 and close against the latter during which the flanges 6 become engaged with the continuous flanges 4 in the manner shown in Figure 3. If a strainer is desired, as it usually is in coffee pots, a suitable strainer plate 7, also tapered, is first seated in the bead formed by the flanges 6 of the spout as shown in Figure 5 so that its margins are confined between portions of the flanges 4 and 6 as shown in Figure 3.

The final operation is to compress and flatten the flanges 4 and 6 together so that they become interlocked in a continuous seam in the manner illustrated in Figure 4 with the strainer plate 7 clamped between them. In so doing, the whole seam is offset or pressed inwardly toward the wall 2 so that an embossed rib 8 is formed on the inside of the pot surrounding the spout which rib is rounded and smooth so as not to injure the hands or invite the accumulation of deposits. This brings the strainer plate 7 into substantially the plane of the wall 2 and at the same time sinks the seam into the wall in such a manner as to make it and the entire spout less prominent and the joint neat in appearance.

A spout formed and attached in accordance with my invention produces a tight seam that is continuous and does not require soldering which, as previously stated, is to be avoided in aluminum ware.

I claim as my invention:

1. In a pot or similar vessel, the combination with a body wall having a downwardly tapered opening therein provided with a continuous outward and lateral flange along all of its edges other than the top edge, of a similarly tapered spout having a continuous inwardly turned doubled flange on its corresponding edges adapted to be engaged, in assembling, with those on the body wall by an upward movement of the spout, said two sets of flanges being pressed and flattened into interlocking relationship and the resulting seam being offset into the wall of the vessel to form a shoulder upon the body against which the flange of the spout is adapted to rest to prevent downward displacement of said spout.

2. In combination, a pot or similar vessel having a downwardly tapered opening in its wall, the sides and lower extremities of which are provided with an outwardly turned and downwardly bent flange forming a U-shaped channel, the inner leg of which is offset to form with the body of the vessel a shoulder, and a spout having an inwardly turned flange disposed within the channel and engaging said shoulder, the latter preventing displacement of the spout in a downward direction.

KURT BARTHELMES.